(12) United States Patent
Sonnenberg

(10) Patent No.: US 6,902,187 B2
(45) Date of Patent: Jun. 7, 2005

(54) APPARATUS AND METHOD FOR AIRBAG CURTAIN MODULE WITH SECONDARY ATTACHMENT DEVICE

(75) Inventor: John Sonnenberg, Holly, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/996,021

(22) Filed: Nov. 19, 2001

(65) Prior Publication Data

US 2003/0094797 A1 May 22, 2003

(51) Int. Cl.⁷ ............................................. B60R 21/22
(52) U.S. Cl. .................................................. 280/730.2
(58) Field of Search ......................... 280/730.2, 730.1, 280/728.2

(56) References Cited

U.S. PATENT DOCUMENTS

| | | | |
|---|---|---|---|
| 5,540,459 A | | 7/1996 | Daniel |
| 6,022,044 A | * | 2/2000 | Cherry ..................... 280/730.2 |
| 6,073,961 A | | 6/2000 | Bailey et al. |
| 6,082,761 A | * | 7/2000 | Kato et al. ............... 280/730.2 |
| 6,152,482 A | | 11/2000 | Patel et al. |
| 6,227,561 B1 | | 5/2001 | Jost et al. |
| 6,234,517 B1 | | 5/2001 | Miyahara et al. |
| 6,237,943 B1 | | 5/2001 | Brown et al. |
| 6,254,123 B1 | | 7/2001 | Urushi et al. |
| 6,257,616 B1 | | 7/2001 | Nowak et al. |
| 6,305,707 B1 | * | 10/2001 | Ishiyama et al. ........ 280/728.2 |
| 6,338,498 B1 | | 1/2002 | Niederman et al. |
| 6,450,529 B1 | * | 9/2002 | Kalandek et al. ........ 280/730.2 |

* cited by examiner

*Primary Examiner*—Faye M. Fleming
(74) *Attorney, Agent, or Firm*—Sally J. Brown

(57) ABSTRACT

A vehicle occupant restraint module includes an inflatable curtain having a first edge and a second edge. The inflatable curtain can be positioned in a folded state. A covering may partially enclose the inflatable curtain when it is in a folded state. A plurality of first attachment members are spaced along and extend from the first edge of the curtain. The covering is configured with slots to allow the first attachment members to extend through the covering. At least one and preferably multiple second attachment members secured to an out-board side of the covering. The first attachment members are positioned to secure a first portion of the module to a vehicle interior. The second attachment members are positioned to secure a second portion of the module to a vehicle interior below the first portion.

33 Claims, 4 Drawing Sheets

APPARATUS AND METHOD FOR AIRBAG CURTAIN MODULE WITH SECONDARY ATTACHMENT DEVICE

BACKGROUND OF THE INVENTION

1. Field of the Invention

The present invention relates to an airbag curtain module with a secondary attachment device. More specifically, the present invention relates to a novel apparatus and method for securing two separate longitudinal portions of a folded airbag curtain to the interior of a vehicle.

2. Description of Related Art

Inflatable safety restraint devices, or airbags, are mandatory on most new vehicles. Airbags are typically installed as part of a system with an airbag module in the steering wheel on the driver's side of car and in the dashboard on the passenger side of a car. In the event of an accident, a sensor within the vehicle measures abnormal deceleration and triggers the ignition of an explosive charge contained within an inflator. Expanding gases from the charge travel through conduits and fill the airbags, which immediately inflate in front of the driver and passenger to protect them from harmful impact with the interior of the car. Airbag systems have also been developed in response to the need for similar protection from lateral impacts between a passenger and the side of a vehicle's interior. This might occur when another vehicle collides with the side of the car, or in a rollover situation where the side of car is repeatedly impacting the ground.

Side impact airbag systems are designed to prevent the head of a vehicle occupant from emerging through the window opening or from colliding with the reaction surface at the side of the vehicle. Side impact airbags have a smaller area than front impact airbags in which to deploy and must be configured to inflate efficiently and in the right direction. There is also less space to install side impact airbags. Side inflatable airbag curtains are typically attached to the roof rail of a car behind the head liner. The roof rail is the metal portion of the car frame which extends along the side of the car at the junction of the side doors and the roof. The head liner is an interior component which covers the roof rail at the door seal.

Side airbag modules typically include an inflatable curtain folded into a predetermined configuration and then placed in a covering, wrap, or housing. Most side airbag modules include a single attachment means for securing the airbag module to the roof rail. When the airbag curtain is in a folded state, the airbag module is long, narrow, and flexible. The problem with most side impact air modules is that their long and narrow configuration makes them awkward and clumsy to install. The folded airbag must be positioned next to the roof rail or other frame member to which it will be attached. Often times, the roof rail is curved, and the installer needs both hands to align the somewhat flimsy folded airbag and module with the curved or twisted roof rail. This makes it extremely difficult if not impossible for the installer to operate the tool used to mount the airbag curtain to the vehicle. Sometimes this problem is overcome by using separate positioning equipment, or using multiple people to install the airbag curtain. Unfortunately, the use of additional equipment, tools, or human resources drives up the cost of installation. If the installer were to use one hand to steady the airbag curtain and the other hand to secure a portion of the curtain to the vehicle interior, the folded airbag curtain may bend, fold, or crimp, which may negatively effect the fold configuration of the airbag causing the airbag to inefficiently or improperly deploy upon inflation.

Another problem with known airbag modules stems from the fact that most roof rails to which the folded side impact airbag module is to be attached are not completely vertical. They are long angled pieces and even after a primary attachment area of the folded curtain is secured to the vehicle interior, the wrapped or covered curtain dangles down and away from the roof rail to which it is to be attached. The dangling airbag curtain module interferes with the assembly of the final interior trim. Additionally, side airbag curtain modules have less space in which to be installed, and it is preferable that they are installed in their most compact form. Dangling airbag curtain modules are not compact.

Thus, it would be an advantage to provide an airbag curtain module which allowed the installer to secure the primary attachment source to the interior of a vehicle without the need for extra tools, equipment, or human resources. It would also be an advantage to provide such an airbag curtain module that would allow the folded airbag to be pivoted out of the way and attached to the frame of a vehicle such that packaging and assembly of the final interior trim of the vehicle could be easily accomplished without interference from the folded inflatable curtain. It would also be an advancement to provide such an airbag curtain that was less expensive and easier to install.

Such an airbag curtain module and method of folding are disclosed and claimed herein.

BRIEF SUMMARY OF THE INVENTION

The apparatus of the present invention has been developed in response to the present state of the art, and in particular, in response to the problems and needs in the art that have not yet been fully solved by currently available inflatable airbag curtains and curtain folding methods. Thus, it is an overall objective of the present invention to provide a novel airbag curtain module and method for attaching an airbag curtain module which allows for more cost effective and easier installment than was possible with prior art systems.

To achieve the foregoing and other objectives, and in accordance with the invention as embodied and broadly described herein, an airbag curtain module with a novel attachment configuration is provided. The airbag curtain module includes an inflatable curtain which has a first edge and a second edge. The inflatable curtain can be positioned in a number of folded configurations when in an uninflated state. The airbag curtain module may include a covering for partially or fully enclosing the inflatable curtain. At least one and preferably several first attachment members are spaced along the first edge of the curtain. These first attachment members may include openings for a connector to secure a first portion of the module to the interior of a vehicle. The first attachment members may include tabs which extend through the covering when the covering is positioned about the folded airbag curtain.

At least one, and preferably multiple second attachment members are secured to an out-board side of the covering. When the covering is positioned about the folded airbag curtain, at least one of the second attachment members is positioned between at least one of the first attachment members and a bottom portion of the covering or module in locations anywhere along the longitudinal direction. Thus, the second attachment member may secure a second portion of the module between the first portion and a bottom portion of the module, when the first portion of the module is secured to the interior of the vehicle. This allows the module to be installed in closer conformity to the vehicle interior for greater compactness.

In one embodiment, the second attachment member includes a substantially flat magnet sewn into a pocket or affixed by any other attachment means on the outboard side of the cover. A plurality of magnets may be spaced adjacent to, and beneath the first attachment members or anywhere along the outboard side of the curtain when the covering is positioned about the curtain.

Each magnet has a magnetic field strength which permits the module to be secured to a vehicle interior and which also permits the detachment of the magnet from a vehicle interior with minimal force applied by a user. Thus, the user may opt to generally position the module against the vehicle roof-rail and temporarily secure the module with the magnets while securing the first attachment members in place. The magnets also allow the module to be removed without leaving residue or holes along the vehicle interior.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention.

Figure 1:
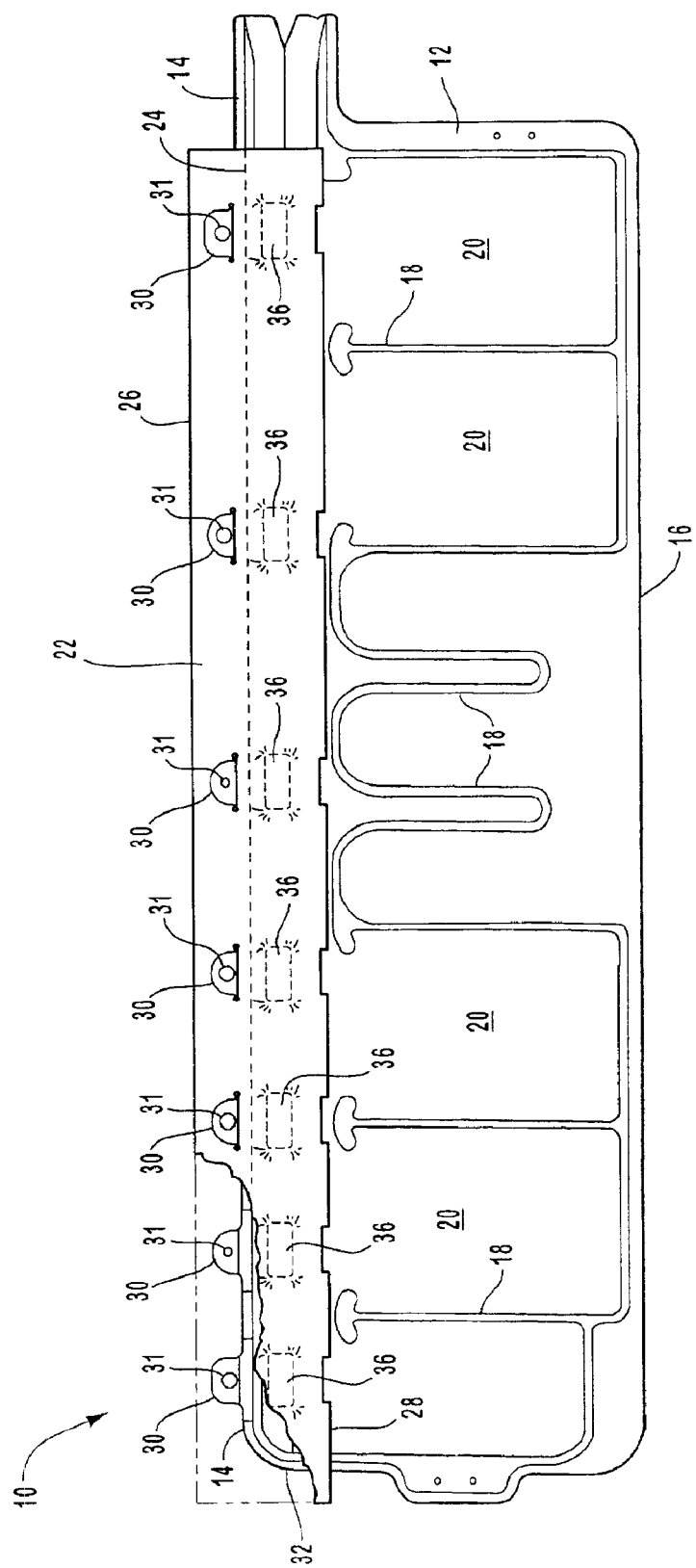
FIG. 1 is a partially cut away front plan view of an airbag curtain module of the present invention with the curtain in an unfolded state attached to a covering.

With particular reference to FIG. 1, an airbag module utilizing the present invention is generally designated at 10. The airbag module 10, includes an inflatable curtain 12 having a first edge 14 and a second edge 16. The curtain 12 is typically configured of 2 pieces of semi-permeable material attached to each other by means known in the art. The pieces may be attached to each other at seams 18 to form distinct chambers 20, each of which will retain inflation fluid such as gas produced by an inflator (not shown).

The airbag module 10 also includes a covering 22. The covering 22 is preferably configured to at least partially enclose the inflatable curtain 12 in a folded state. The covering 22 may be substantially as long as the curtain 12. In the preferred embodiment of the curtain 12 illustrated in FIG. 1, the covering 22 is attached to the curtain 12 along a stitch line 24. The covering 22 may be configured to permit a first edge 26 of the covering 22 to be attached along a second edge 28 of the covering 22 about the curtain 12 when the curtain 12 is in a folded state.

The curtain 12 includes a plurality of first attachment members 30 spaced along the first edge 14 of the curtain, the first attachment members 30 allow a first portion 32 of the module 10 to be secured to the interior of a vehicle. The first attachment members 30 may be configured with an opening 31 to receive a connector such as a screw, bolt, rivet, pin and the like, for attaching the module 10 to a roof rail of the vehicle interior. In an alternative embodiment, the first attachment members 30 may be attached to the vehicle interior by adhesive, bonding, welding, and the like. In the embodiment illustrated in FIG. 1, the attachment members are tabs 30. The tabs 30 extend from the first edge 14 of the curtain airbag 12 such that after the curtain 12 is in a fully folded state, the curtain 12 can be attached to the roof rail or other interior component of the vehicle (see FIG. 3).

The covering 22 includes at least one and preferably a same number of slots 34 as the number of tabs 30. The slots 34 are positioned and configured to receive the attachment tabs 30. It will be appreciated that in this configuration, the curtain 12 may be folded and enclosed by the covering 22, and still leave the attachment tabs 30 accessible for attachment of the curtain 12 to the interior of the vehicle. The attachment tabs 30 also allow the curtain 12 to be inflated without interference from whatever means may be used to attach the curtain 12 to the vehicle. In another embodiment, the first attachment members 30 may be connected to or secured to part of the covering 22 itself. In this configuration, there would be no need for the slots 34.

At least one second attachment member 36 is positioned near the first attachment members 30. A plurality of second attachment members 36 may be positioned substantially parallel to the first attachment members 30. In the embodiment, illustrated in FIG. 1, the second attachment members 36 are secured to the covering 22 such that when the covering 22 is secured about the folded curtain 12, and the module 10 is secured to the interior of a vehicle, the second attachment members 36 are below or adjacent to the first attachment member 30.

Figure 2:
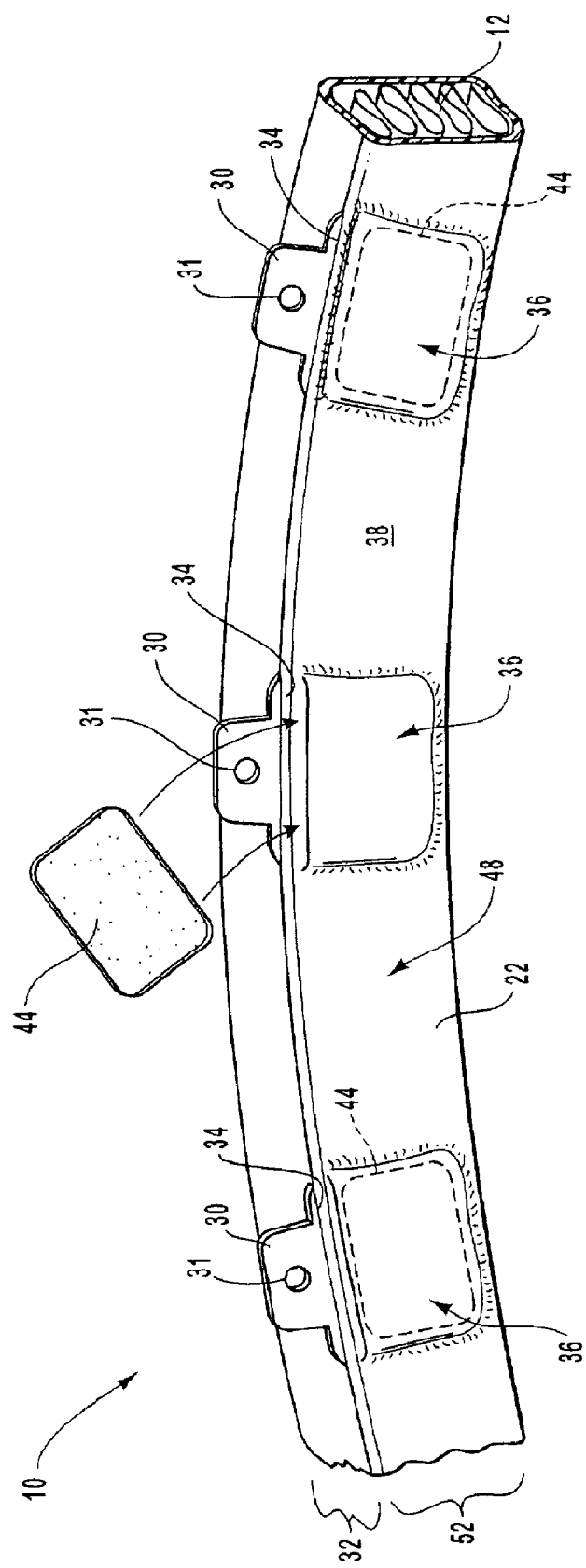
FIG. 2 is a perspective view of a portion of the airbag curtain module of FIG. 1 with the covering positioned about a folded airbag curtain.
Figure 3:
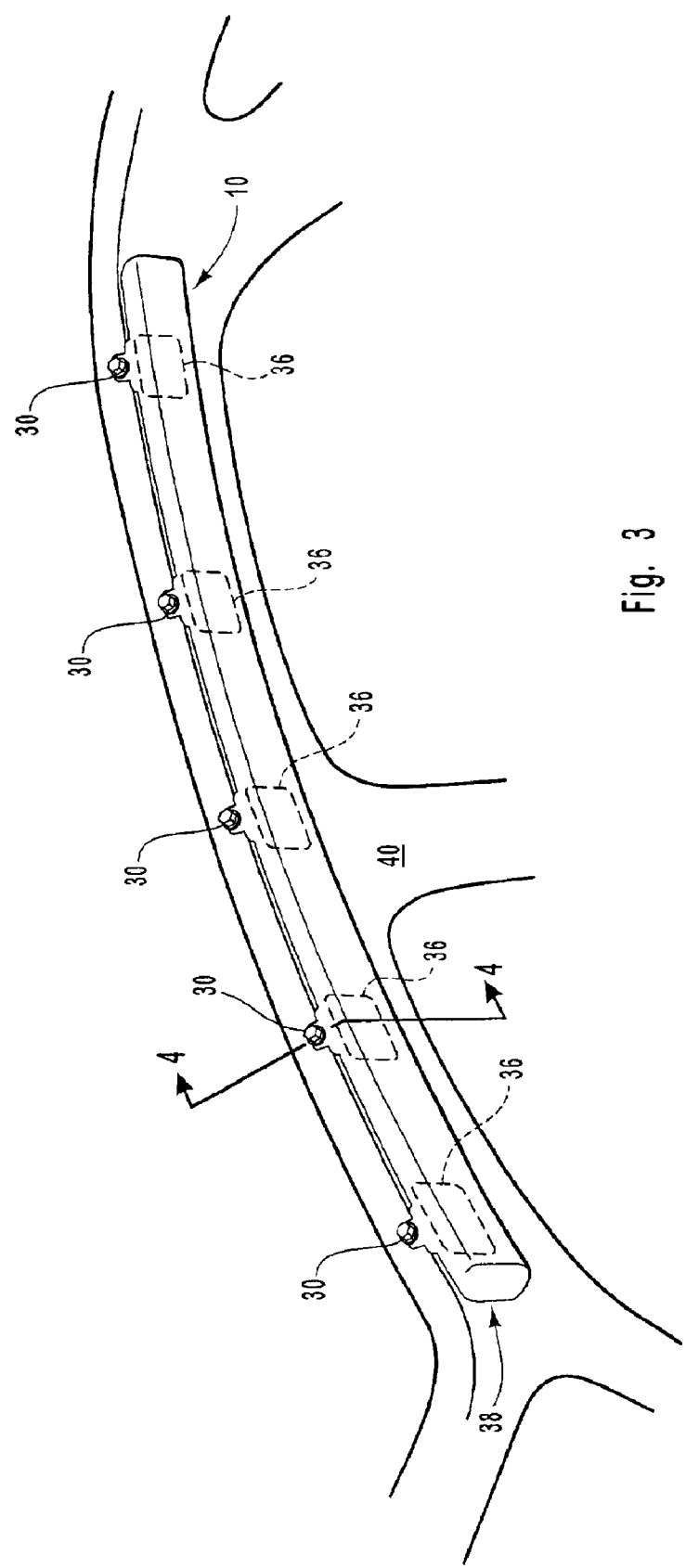
FIG. 3 is a perspective view of the airbag curtain module of the present invention.

Referring now to FIGS. 2 and 3, the module 10 is illustrated in a folded configuration with the covering 22 secured about the folded airbag curtain 12. The plurality of second attachment members 36 are spaced along an outboard side 38 of the covering 22. The first attachment members 30, which in one embodiment extend from the first edge 14 of the curtain 12, extend through slots 34 in the covering 22. In the illustrated embodiment, the second attachment members 36 are aligned with the first attachment members 30. When the airbag module 10 is secured to the interior 40 (FIG. 3) of a vehicle the second attachment members 36 are secured to the covering 22 are positioned below the first attachment members.

The second attachment member 36 is configured to secure a second portion 52 of the module 10 to the interior 40 of the vehicle when the curtain 12 is secured within the covering 22. The second portion 52 is between the first portion 32 and a bottom portion 54 of the module 10 when the module 10 is secured to the interior 40 of the vehicle. Because the module 10, with the curtain 12 retained in a folded state, is long and narrow, the first portion 31 is a longitudinal portion adjacent the first attachment members 30 and the second portion 52 is also a longitudinal portion adjacent the second attachment members 36. Accordingly, once the first portion 31 of the module 10 is secured to the vehicle interior, the module 10 may be pivoted out of the way and attached at the second portion to the interior 40 by the second attachment members 36 (see FIG. 4). The dual attachment configuration allows the module 10 to be compactly and efficiently secured within the vehicle.

The second attachment member 36 comprises a magnet 44 positioned within a pocket 46. The magnet 44 is substantially flat and thin for compactness. A plurality of magnets 46 are spaced near the first edge 14 of the inflatable curtain 12. Each magnet 44 may be positioned opposite to, and adjacent to, one of the plurality of first attachment members 30. In a preferred embodiment, the pockets are configured along an outboard side 38 of the covering 22. The magnet 44 has a magnetic field strength which permits the detachment of the magnet 44 from a vehicle interior 40 with minimal force applied by a user. It will be appreciated by those of skill in the art that this allows the module 10 to be detached from the vehicle interior 40 in certain applications without leaving a noticeable hole, mark, or residue at the vehicle interior 40 adjacent the second portion 52 of the module 10.

Each pocket 46 may be positioned along an exterior surface 48 of the outboard side 38 of the covering 22 or along an interior surface 50 of the outboard side of the covering 22. The pockets 46 may be sewn to the covering 22 using nylon thread. In the illustrated invention, number 46 nylon thread is used at six to eight stitches per inch. It will be appreciated by those of skill in the art that the covering 22 may be attached to the curtain 12 in a variety of ways, including but not limited to, adhesive bonding, chemical bonding, heat welding, RF welding, and swaging. The curtain 12, covering 22, and pocket 46 may be constructed of suitable materials including, but not limited to woven polymeric yarn fibers, such as nylon or polyester. Nylon 6 and nylon 6_6 are examples of preferred yarn materials. Other conventional yarns can be used in the fabric layer, typically having a denier ranging from about 210 to 630. The weave density will vary depending upon the desired fabric permeability and the yarn denier. For a typical 420 denier yarn, the weave density will range from 46×46 yarns per inch to 53×53 yarns per inch. Other suitable materials may include non woven nylon, including Cerex PBN II at 3 ounces per square yard. The curtain 12, covering 22 and pocket fabric may be coated with an impermeable coating on the interior surface (not shown) of the fabric. Currently preferred coating materials include, but are not limited to, urethanes and silicone/urethanes. Other known and novel fabric coating materials can be used. Once the magnets 44 are positioned within the pockets 46, a stitch may be placed at a pocket opening 47 to secure each magnet 44 within a respective pocket 46.

In an alternative embodiment, the second attachment member 36 includes an adhesive attached to the covering 22 sufficient to adhere the covering 22 to the vehicle interior 40. The second attachment member 36 may also include a clip attached to the covering 22 configured for attachment of, the covering 22 to the vehicle interior 40. The second attachment member 46 may be secured relative to the first attachment member 30 in a number of ways and still allow the module 10 to be pivoted into a more compact position. For instance, the second attachment members 36 may be offset from the first attachment members 30. Furthermore, the number of second attachment members 36 need not equal the number of first attachment members 30. At least one second attachment member 30 should be spaced from the first attachment members is the transverse direction to allow for two separate longitudinal areas to be attached to the vehicle interior 40. In this configuration, the outboard side 38 of the folded module more closely conforms to the configuration of the vehicle interior 40 to which the module 10 is being attached.

Figure 4:
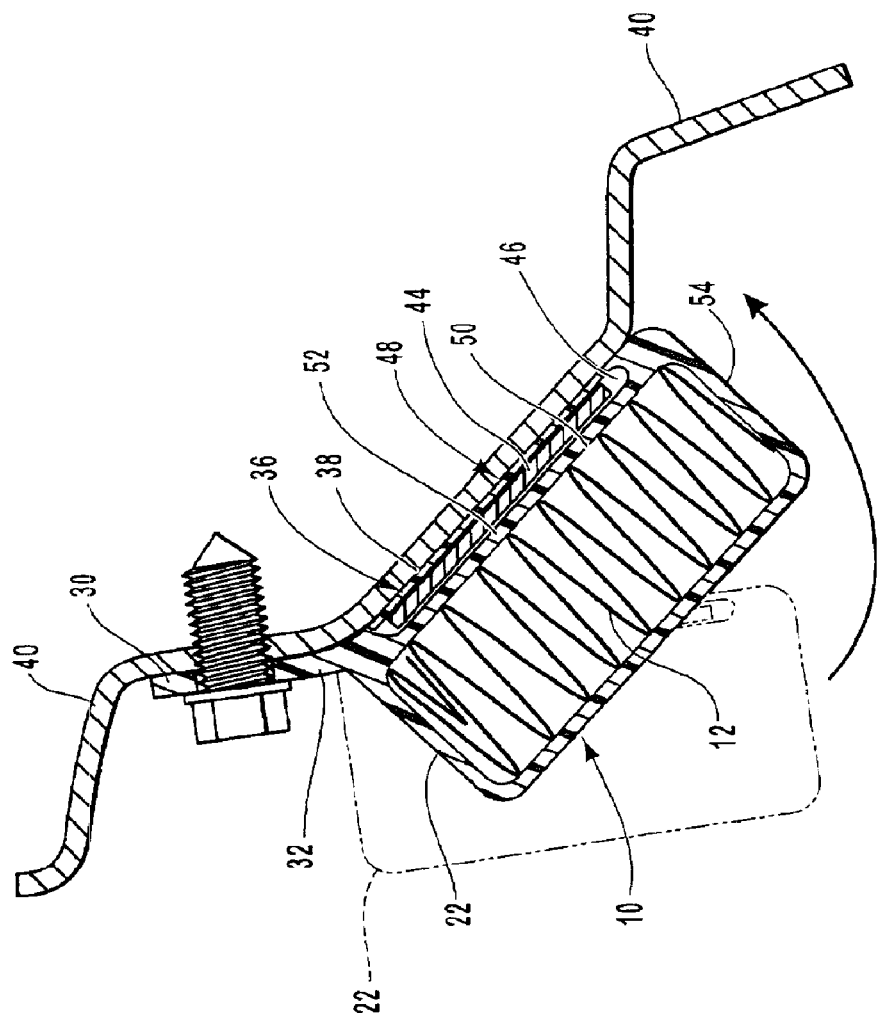
FIG. 4 is a side cross-section view of the airbag curtain module of FIG. 3 along line A—A with a first dangling position of the module shown in phantom.

Referring now to FIG. 4, the curtain 12 of the airbag curtain module 10 is first folded into a predetermined configuration. The covering 22 may then be secured about the folded curtain 12. The module 10 is secured by means of the first attachment members 30 to the interior 40 of a vehicle and then the second attachment members 36 are secured to the vehicle interior at a position below the first attachment members 30. In this configuration, the second longitudinal portion 52 of the module is below the first portion of the module allowing the module to be attached in close conformity to the shape of the interior 40 piece to which the module 10 is to be secured. Where the second attachment members are magnets, the second attachment member 36 is positioned adjacent a metallic surface to permit the magnetic force of the magnet to secure the module to a vehicle interior. The installer may also decide to first use the magnet 44 or second attachment member 36 to loosely position the module 10 along the roof-rail of the vehicle interior 40 so that it is substantially in place. The installer then has both hands free to secure the first attachment members 30 to the interior 40. The installer may position the second attachment members 36 in their final position.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag curtain module, comprising:
   an inflatable curtain having a first edge and a second edge, the inflatable curtain being positionable in an uninflated folded state;
   a plurality of first attachment members positioned adjacent the first edge of the curtain, the first attachment members being capable of securing a first portion of the module to the interior of a vehicle; and
   a plurality of second attachment members capable of securing a second portion of the module to the interior of the vehicle the second attachment members spaced along an out-board side of the module, wherein the second attachment members are securable to one of a plurality of attachment locations and wherein the second attachment members are positioned between the first attachment members and a bottom portion of the covering when the covering is positioned about the curtain and the module is attached to the interior of a vehicle.

2. The module of claim 1, wherein the first attachment members comprise at least one tab extending from the first edge of the curtain.

3. The module of claim 2, wherein the tab defines an opening for receiving a connector to secure the curtain to an interior of the vehicle.

4. The module of claim 1, wherein the second attachment members are secured to the curtain below the first attachment members when the airbag module is attached to the interior of the vehicle.

5. The module of claim 1, further comprising a covering configured to at least partially enclose the inflatable curtain.

6. The module of claim 5, wherein the first attachment members are secured to the covering.

7. The module of claim 5, wherein the second attachment members are secured to the covering at a position below at least one of the first attachment members when the airbag is secured to the interior of a vehicle.

8. The module of claim 1, wherein the second attachment members comprise magnets.

9. The module of claim 8, wherein a plurality of substantially flat magnets are spaced near the first edge of the inflatable curtain.

10. The module of claim 8, wherein the magnets have a magnetic field strength which permits the module to be secured to a vehicle interior and which also permits the detachment of the magnets from a vehicle interior with minimal force applied by a user.

11. The module of claim 1, wherein the second attachment members comprise an adhesive sufficient to adhere the curtain to a vehicle interior.

12. The module of claim 1, wherein the second attachment members comprise clips configured for attachment to a vehicle interior.

13. A vehicle occupant restraint module, comprising:
an inflatable curtain having a first edge and a second edge, the inflatable curtain being positionable in an uninflated folded state;
a covering configured to at least partially enclose the inflatable curtain when in the uninflated folded state;
a plurality of first attachment members spaced along the first edge of the curtain, the first attachment members configured to receive a connector for securing the module to the interior of a vehicle; and
a plurality of second attachment members spaced along an out-board side of the covering wherein the second attachment members are positioned between the first attachment members and a bottom portion of the covering when the covering is positioned about the curtain and the module is attached to the interior of a vehicle.

14. The module of claim 13, wherein the first attachment members are positioned to secure a first portion of the module to a vehicle interior and the second attachment members are positioned to secure a second portion of the module to the vehicle interior below the first portion.

15. The module of claim 13, wherein the second attachment members are positioned substantially parallel to the first attachment members.

16. The module of claim 15, wherein the second attachment members comprise magnets.

17. The module of claim 16, wherein a plurality of magnets are spaced along an out-board side of the covering below the first attachment members when the module is secured to a vehicle interior.

18. The method of claim 17, wherein each magnet is positioned opposite to, and adjacent to, one of the plurality of first attachment members.

19. The module of claim 16, wherein the magnets have a magnetic field strength which permits the detachment of the magnet from a vehicle interior with minimal force applied by a user.

20. The module of claim 13, wherein the second attachment members comprise adhesive attached to the covering sufficient to adhere the covering to a vehicle interior.

21. The module of claim 13, wherein the second attachment members comprise clips attached to the covering configured for attachment of the covering to a vehicle interior.

22. A vehicle occupant restraint module, comprising:
an inflatable curtain having a first edge and a second edge, the inflatable curtain being positionable in an uninflated folded state;
a covering configured to at least partially enclose the inflatable curtain in a folded state;
a plurality of first attachment members configured to receive a connector for securing the module to the interior of a vehicle; and
a plurality of magnets secured to an out-board side of the covering, at least one magnet being positioned between a first attachment member and a bottom portion of the covering when the curtain is in a folded state within the covering, and the module is secured to a vehicle interior.

23. A method for attaching an airbag curtain module to the interior of a vehicle, the module comprises an inflatable curtain configurable in a folded state, a covering configured to at least partially enclose the inflatable curtain in the folded state, a plurality of first attachment members spaced along the first edge of the curtain, and at least one second attachment member secured to an out-board side of the covering between the first attachment member and a bottom portion of the covering, wherein the at least one second attachment member is securable to one of a plurality of attachment locations, comprising:
folding the airbag curtain into a predetermined configuration;
securing the covering about the airbag curtain;
securing the first attachment members to the interior of a vehicle; and
securing the second attachment members to the interior of a vehicle at a position below the first attachment members, wherein the second attachment member is secured to the vehicle interior before the first attachment member is secured to the vehicle interior.

24. The method of claim 23, wherein the second attachment member comprises a magnet and the step of securing the second attachment member comprises positioning the module adjacent a metallic surface to permit the magnetic force of the magnet force of the magnet to secure the module to a vehicle interior.

25. An airbag curtain module, comprising:
an inflatable curtain in an uninflated state;
a plurality of first attachment members positioned adjacent the first edge of the curtain, wherein the first attachment members secure a first portion of the module to the interior of a vehicle; and a second attachment member securing a second portion of the module to the interior of the vehicle, wherein the at least one second attachment member is secured to the interior of the vehicle by itself, wherein the second portion is between the first portion of the module and a bottom portion of the module, when the first portion of the module is secured to the interior of the vehicle.

26. The module of claim 25, wherein the second attachment member comprises a magnet.

27. The module of claim 26, wherein the magnet has a magnetic field strength which permits the module to be secured to a vehicle interior and which also permits the detachment of the magnet from a vehicle interior with minimal force applied by a user.

28. The module of claim 25, wherein the second attachment member comprises an adhesive sufficient to adhere the curtain to a vehicle interior.

29. The module of claim 25, wherein the second attachment member comprises a clip configured for attachment to a vehicle interior.

30. An airbag curtain module, comprising:

an inflatable curtain in an uninflated state;

a plurality of first attachment members positioned adjacent the first edge of the curtain, wherein the first attachment members secure a first portion of the module to the interior of a vehicle; and a second attachment member, comprising a magnet securing a second portion of the module to the interior of the vehicle, wherein the second attachment member is secured to the interior of the vehicle by urging the second attachment member against the interior of the vehicle, the second attachment member being secured to one of a plurality of attachment locations, wherein the second portion is between the first portion of the module and a bottom portion of the module, when the first portion of the module is secured to the interior of the vehicle.

31. The module of claim 30, wherein the magnet has a magnetic field strength which permits the module to be secured to a vehicle interior and which also permits the detachment of the magnet from a vehicle interior with minimal force applied by a user.

32. The module of claim 30, wherein the second attachment member comprises an adhesive sufficient to adhere the curtain to a vehicle interior.

33. The module of claim 30, wherein the second attachment member comprises a clip configured for attachment to a vehicle interior.

* * * * *